United States Patent
Fujishima

(10) Patent No.: US 8,549,188 B2
(45) Date of Patent: Oct. 1, 2013

(54) ELECTRONIC DEVICE WITH MAIN MICROCOMPUTER AND SUB MICROCOMPUTER

(75) Inventor: Yoshikazu Fujishima, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 29 days.

(21) Appl. No.: 13/354,348

(22) Filed: Jan. 20, 2012

(65) Prior Publication Data

US 2012/0191992 A1     Jul. 26, 2012

(30) Foreign Application Priority Data

Jan. 25, 2011  (JP) .................................. 2011-012800

(51) Int. Cl.
*G06F 3/00*       (2006.01)
*G06F 13/00*      (2006.01)

(52) U.S. Cl.
USPC ............. 710/14; 710/2; 710/5; 710/8; 710/15

(58) Field of Classification Search
None
See application file for complete search history.

(56) References Cited

U.S. PATENT DOCUMENTS

2013/0019213 A1*  1/2013  Panofsky et al. ............. 716/101
2013/0024645 A1*  1/2013  Cheriton et al. ............. 711/206

FOREIGN PATENT DOCUMENTS

JP     2003-317382 A    11/2003
JP     2006-244573 A     9/2006

* cited by examiner

*Primary Examiner* — Scott Sun
(74) *Attorney, Agent, or Firm* — Yokoi & Co., U.S.A., Inc.; Toshiyuki Yokoi

(57) ABSTRACT

The present invention discloses an electronic device having a main microcomputer that controls some functions of the electronic device, and a sub microcomputer that executes a process according to an operation input from an external device by using a control program. The sub microcomputer has a first memory that stores plural control programs respectively corresponding to each different specification of the electronic device. The main microcomputer has a second memory that stores specification information to specify the electronic device and sends a selection instruction of the specification to the sub microcomputer based on the specification information stored in the second memory. The sub microcomputer selects the control program corresponding to the specification indicated by the selection instruction from the plural control programs stored in the first memory and then executes a process according to the selected control program.

4 Claims, 2 Drawing Sheets

ELECTRONIC DEVICE WITH MAIN MICROCOMPUTER AND SUB MICROCOMPUTER

CROSS-REFERENCES TO RELATED APPLICATIONS

The present application is related to the Japanese Patent Application No. 2011-012800, Jan. 25, 2011, the entire disclosure of which is expressly incorporated by reference herein.

BACKGROUND OF THE INVENTION

1. Field of the Invention

The present invention relates to an electronic device provided with plural microcomputers.

2. Description of the Related Art

Japanese Patent Application Publication No. 2006-244573 and Japanese Patent Application Publication No. 2003-317382 disclose an electronic device provided with a control section (a main microcomputer) for controlling main functions of the electronic device, and another control section (a sub microcomputer) for controlling other functions. The sub microcomputer executes various processes according to product specifications. For example, the sub microcomputer executes processes according to an operation input from an external device such as a remote controller device and an operation panel, and controls LED lighting for the product. Because electronic devices such as a DVD player, Blue-ray player, or other media players have different specifications according to the difference of model and destination, the function of the sub microcomputer should be specified according to the difference of the specification. In other words, the sub microcomputer should function according to the specification of the device on which the sub microcomputer is mounted. In the conventional electronic device, according to the product specification, electric potential of each port that comprises a circuit of the sub microcomputer is specified to a high level or a low level by comprising a pull-up circuit or a pull-down circuit, and thus the sub microcomputer recognizes and selects the specification according to the specified level of the each port (according to a combination of the high level and the low level).

In addition, Japanese Patent Application Publication No. 2006-244573 discloses an electronic device provided with a main microcomputer for controlling the system of the electronic device and a sub microcomputer for processing a signal input from panel keys, wherein, according to model specifications or destination specifications of the electronic device written in a ROM of the main microcomputer, the main microcomputer stores a key code of a key definition value table written in the ROM to an address in a first RAM of the main microcomputer corresponding to each position of the panel key of an operation panel, and then transfers the key code of a key table stored in the first RAM to the sub microcomputer, the sub microcomputer stores the transferred key code of the key table to an address in a second RAM of the sub microcomputer corresponding to each position of the panel keys of the operation panel, and when a certain panel key of the operation panel is operated, the sub microcomputer transmits the key code stored in a certain address in the second RAM corresponding to the position of the operated panel key to the main microcomputer.

In the conventional devices, in order to specify a level of each port, an additional work is required to change hardware configuration including a change of circuit elements such as a register according to the specification of the electronic device. Further, in Japanese Patent Application Publication No. 2006-244573, the main microcomputer transfers the key code of the key table stored in the first RAM to the sub microcomputer, and then the key code is stored in the key table of the second RAM of the sub microcomputer in order to let the sub microcomputer recognize the relations between the key code and the panel key of the operation panel. However, such a method to specify the sub microcomputer according to the product specification can be further improved.

BRIEF SUMMARY OF THE INVENTION

The present invention discloses an electronic device in which a sub microcomputer could be easily and certainly specified according to the product specification without changing hardware or requiring complex processes.

One aspect of the present invention provides an electronic device comprising:

a main microcomputer that controls some functions of the electronic device, and a sub microcomputer that executes a process according to an operation input from an external device by using a control program, wherein the sub microcomputer has a first memory that stores plural control programs respectively corresponding to each different specification of the electronic device, the main microcomputer has a second memory that stores specification information to specify the electronic device and sends a selection instruction of the specification to the sub microcomputer based on the specification information stored in the second memory, and the sub microcomputer selects a control program corresponding to the specification indicated by the selection instruction from the plural control programs stored in the first memory and then executes a process according to the selected control program.

According to the aspect above, plural control programs corresponding to each specification of the electronic devices are preliminarily stored in the first memory of the sub microcomputer. When the selection instruction of the specification is sent from the main microcomputer, the sub microcomputer selects a control program corresponding to the selection instruction. Therefore, the sub microcomputer can extremely easily select the control program according to the specification of the electronic device, and after that the sub microcomputer can execute correct processes according to the specification under the control of the selected control program.

DETAILED DESCRIPTION OF THE INVENTION

Another aspect of the present invention provides, when the electronic device is connected to an external power source, the main microcomputer is turned on after the sub microcomputer is turned on, the main microcomputer sends the selection instruction to the sub microcomputer after communication with the sub microcomputer is established, and then the main microcomputer is turned off.

Another aspect of the present invention provides, based on the operation input from the external device, when the sub microcomputer receives a predetermined instruction signal in which an operation instruction is assigned without depending on the specification of the electronic device before selecting the control program according to the selection instruction received from the main microcomputer, the sub microcomputer executes the assigned operation.

Another aspect of the present invention provides an electronic device comprising:

the main microcomputer that controls functions including an image processing and a power supply control, the sub microcomputer that executes processes according to an operation input from external device including a remote controller device and an operation panel by using the control program, wherein during a standby state where an AC cable of the electronic device is connected to an external power source and an instruction to turn on the electronic device is not input, the sub microcomputer is turned on and the main microcomputer remains turned off, during the standby state, the main microcomputer is temporarily turned on, the main microcomputer sends the selection instruction to the sub microcomputer after communication with the sub microcomputer is established via a bidirectional communication bus, and then the main microcomputer is turned off, the sub microcomputer interprets the operation input from the external device and executes the process according to the interpreted operation by using the selected control program, and based on the operation input from the external device, when the sub microcomputer receives a predetermined instruction signal in which an operation instruction to shift the electronic device to a power-on state is assigned without depending on the specification of the electronic device before selecting the control program according to the selection instruction received from the main microcomputer, the sub microcomputer instructs the main microcomputer to shift the electronic device to the power-on state.

Note that this invention is not limited to an invention of a product such as the electronic device. The invention can also be applied to an invention of a process where the electronic device executes a process, or an invention of a computer-readable recording media in which the software (program) is recorded to let the electronic device execute the process.

An embodiment of the present invention will be described below with reference to drawings.

Figure 1:
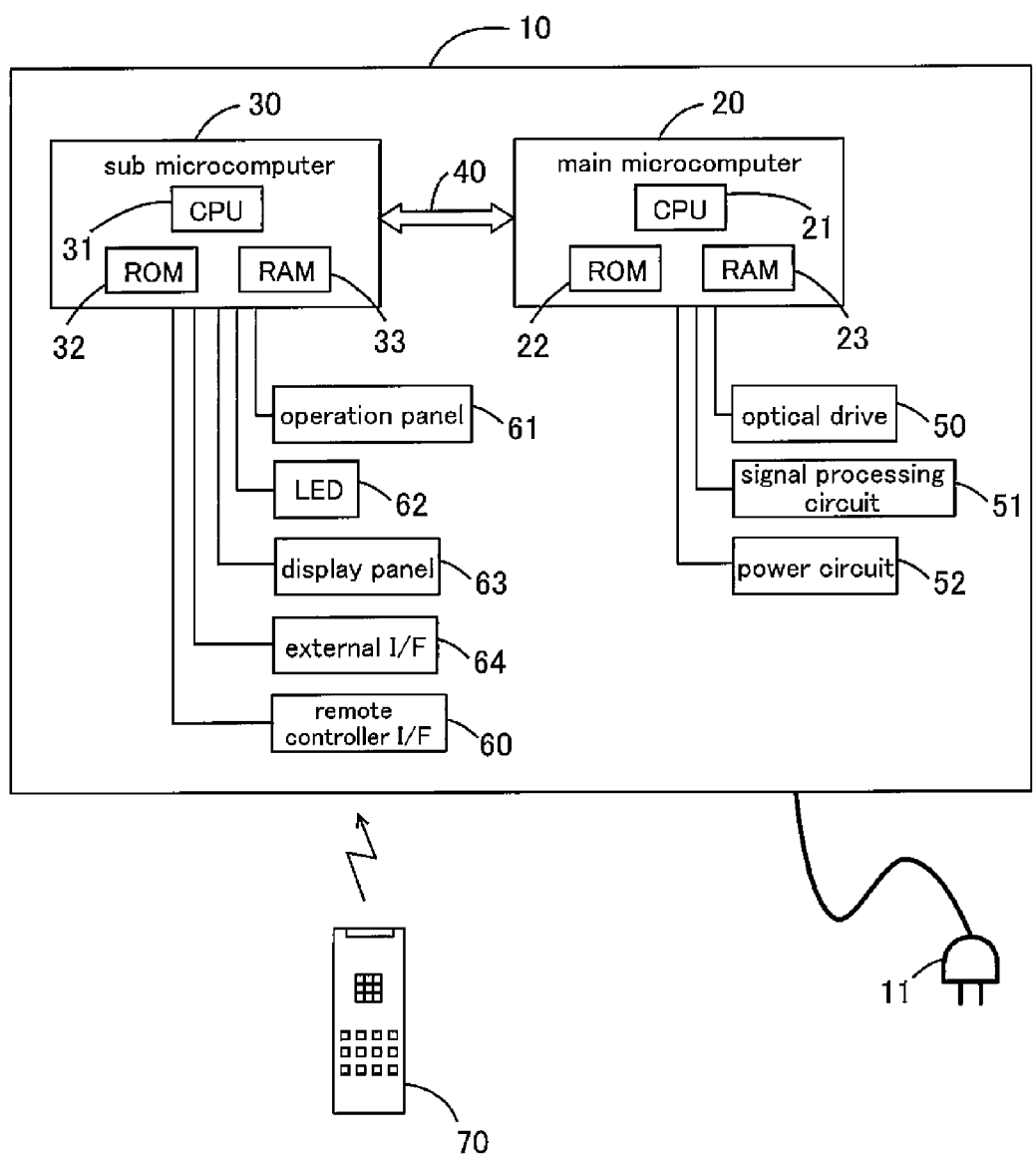
FIG. 1 is a block diagram showing a schematic configuration of an electronic device.

FIG. 1 shows a schematic configuration of an electronic device 10 by a block diagram. An electronic device 10 at least includes a main control section (called as a main microcomputer 20) and another control section (called as a sub microcomputer). The main microcomputer 20 has a CPU 21, a ROM 22, a RAM 23, and so on. The sub microcomputer 30 has a CPU 31, a ROM 32, a RAM 33, and so on. The main microcomputer 20 and the sub microcomputer 30 are connected via IIC bus 40 and can communicate bidirectionally.

For example, the electronic device 10 may be the media player described above. The main microcomputer 20 is connected to an optical drive 50 for reading data from various media and writing data to the media, a signal processing circuit 51 for executing various data processing (e.g. image processing for image signals), a power circuit 52 for supplying a drive voltage to each part of the electronic device 10, and other components specified in the electronic device 10. In the main microcomputer 20, the CPU 21 controls operations of the components according to a firmware that is preliminarily stored in the ROM 22 for controlling the system of the electronic device 10, by using the RAM 23 as a working memory. Further, the ROM 22 stores specification information such as a destination to specify the electronic device 10. In this sense, the ROM 22 corresponds to the second memory in the present invention. The firmware and the specification information can be rewritten if needed.

The sub microcomputer 30 is connected to a remote controller I/F 60 for receiving infrared signals from an external remote controller device 70 and converting the infrared signals to electric signals, an operation panel 61 having plural buttons and keys to input user operations, an LED 62 for indicating the state of the electronic device 10 by lighting based on a predetermined setting, a display panel 63 for user browsing, an external I/F 64 for communicating with other electric devices such as a television by using the HDMI (High Definition Multimedia Interface) or other protocols, and other components. In the sub microcomputer 30, the ROM 32 preliminarily stores control programs respectively corresponding to each specification of the electronic device 10. In this sense, the ROM 32 corresponds to the first memory in the present invention. In the sub microcomputer 30, the CPU 31 executes operations according to the control programs stored in the ROM 32 by using the RAM 33 as a working memory.

For example, the function assigned to each button on the remote controller device 70 can be different between first specification and second specification of the electronic device 10. Therefore, the control program corresponding to the first specification is designed to recognize a user operation as an instruction of a first process (e.g. a playback process) when an operation of a certain button on the remote controller device 70 is input from the remote controller I/F 60, while the control program corresponding to the second specification is designed to recognize the user operation as an operation of a second process that is different from the first process when the operation of the certain button is input from the remote controller I/F 60. In addition, according to the difference of the specification of the electronic device 10, a setting to enable/disable a certain function, a function assigned to each button on the operation panel 61, a lighting function of the LED 62, a display function of the display panel 63, and other functions can be different. Therefore, each control program is designed to execute a process according to the corresponding specification. The process includes, for example, an interpretation of the operation input from the external device, a communication between each section of the electronic device, and control of each section of the electronic device. The control programs corresponding to each specification described in the embodiment can be realized by preparing plural control programs corresponding one-to-one to each specification, combining a common control program corresponding to all specifications with other control programs respectively corresponding to each specification, or preparing one control program reading different setting information corresponding to each specification to substantively realize plural control programs.

Figure 2:
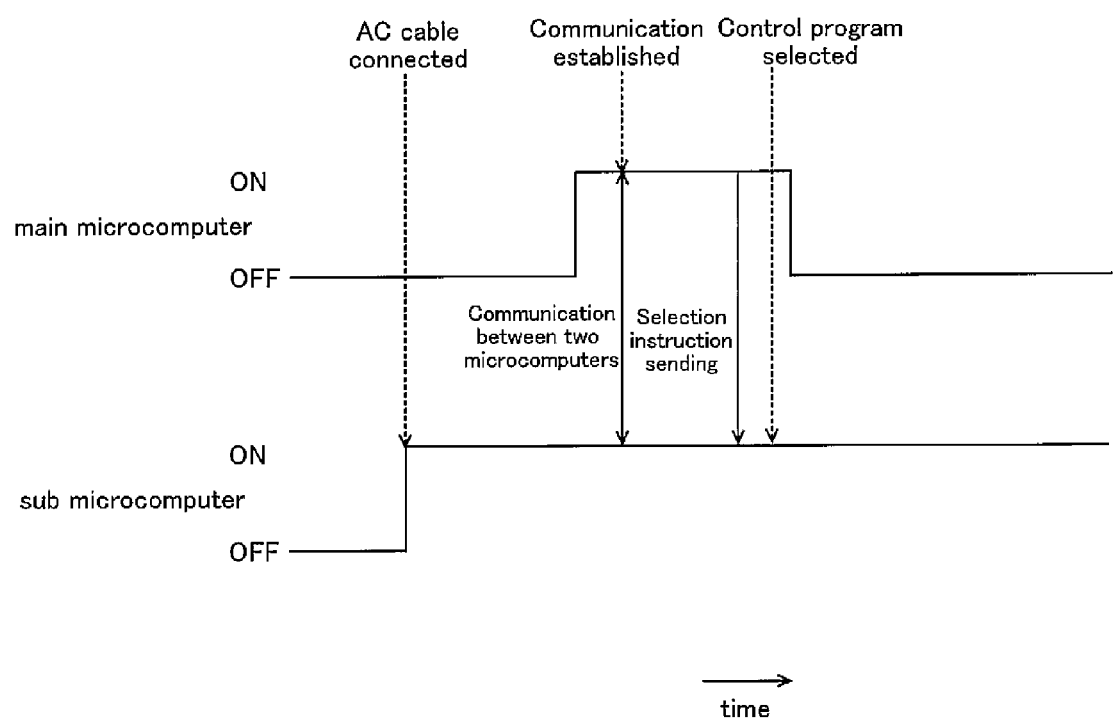
FIG. 2 is a timing chart showing a process for selecting the specification of the sub microcomputer.

FIG. 2 shows a process to select the specification of the sub microcomputer 30 by a timing chart. When the electronic device 10 is in a standby state where an AC cable 11 of the electric device shown in FIG. 1 is connected to an external commercial power source without receiving an instruction to turn on the power from a user, a drive voltage is supplied to the sub microcomputer 30 and the sub microcomputer 30 is turned on. Consequently, during the standby state, the sub microcomputer 30 can monitor inputs of the remote controller I/F 60, the operation panel 61, or other input devices. On the other hand, during the standby state, the drive voltage is not basically supplied to the main microcomputer 20 and the microcomputer 20 remains turned off. However, in this embodiment, the drive voltage is temporarily supplied to the main microcomputer 20 and the main microcomputer 20 is turned on after the AC cable 11 is connected, even during the standby state.

When the main microcomputer 20 is temporarily turned on, communication between the main microcomputer 20 and the sub microcomputer 30 is established by sending and receiving a certain command via the IIC bus 40. After the communication is established, the main microcomputer 20 sends a selection instruction to select the specification indicated by the specification information stored in the ROM 22 to the sub microcomputer 30 via the IIC bus 40. When the sub microcomputer 30 receives the selection instruction, the sub microcomputer 30 selects a control program corresponding to the specification indicated by the selection instruction from the control programs stored in the ROM 32. Then, the sub microcomputer 30 reads out the selected control program to the RAM 33. After that, the sub microcomputer 30 continues to execute processes according to the selected control program until the sub microcomputer is turned off (until the AC cable 11 is disconnected from the external power source). The processes according to the selected control program mean, for example, to interpret the operation input from the remote controller I/F 60 or operation panel 61, to notice the interpreted result to the main microcomputer 20, to control the LED 62 and the display panel 63 according to the interpreted result.

The main microcomputer 20 is turned off again after sending the specification information to the sub microcomputer 30, while the electronic device 10 is still the standby state. As described above, after the sub microcomputer 30 recognizes the specification of the electronic device 10 and selects the control program according to the specification, if a user operates the remote controller device 70 or other input devices to instruct to turn on the electronic device 10, the sub microcomputer 30 sends an instruction to turn on the electronic device 10 to the main microcomputer 20 via the IIC bus 40. Then, the main microcomputer 20 is turned on, the main microcomputer 20 starts controlling the power circuit 52, and the drive voltage is supplied to other sections of the electronic device 10. Namely, the electronic device 10 goes from the standby state to a power-on state.

As described above, according to this embodiment, the sub microcomputer 30 preliminarily stores the control programs respectively corresponding to each specification of the electronic device 10, and just after the main microcomputer 20 is temporarily turned on during the standby state, the sub microcomputer receives the selection instruction of the specification from the main microcomputer 20 and then selects the control program according to the received selection instruction. Consequently, compared to the conventional process where the hardware configuration is changed according to the specification of the electric device to let the function of the sub microcomputer comply with the electric device, the sub microcomputer in the present invention can easily select the specification and thus workload to produce the electronic device 10 can be substantially reduced. As described above, the specification information stored in the ROM 22 of the main microcomputer 20 is rewritable. Therefore, when producing the electronic device 10 that has different specification, different specification information could be written in the ROM 22 of the main microcomputer 20 according to the specification.

The present invention could be applied to various embodiments other than the above described embodiment.

Next, variation examples of the present invention are explained. In the above described embodiment, the sub microcomputer 30 doesn't know the specification of the electronic device 10 and cannot interpret the operation input from the external device before receiving the selection instruction from the main microcomputer 20. By predetermining a certain instruction signal in which an operation instruction is assigned without depending on the specification of the electronic device 10, when the sub microcomputer 30 receives the predetermined instruction signal based on an operation input from the external device such as the remote controller device 70 and the operation panel 61, the sub microcomputer can process the assigned operation before selecting the control program according to the selection instruction.

For example, in case a certain operation signal in which an operation to turn on the electronic device is assigned without depending on the specification of the electronic device 10, when the sub microcomputer 30 receives the predetermined instruction signal based on the operation input from the external device, the sub microcomputer 30 immediately instructs the main microcomputer 20 to shift the electronic device to the power-on state before selecting the control program according to the selection instruction. In other words, a position of a button or the like to instruct to turn on the power on the remote controller device 70 or the operation panel 61 is fixed without depending on the specification of the electronic device 10. When the button or the like is operated, the sub microcomputer 30 interprets an instruction signal (electric signal) as the instruction to turn on the power without depending on the specification of the electronic device 10. By using the configuration above, when a user instructs to turn on the electronic device by operating the remote controller device 70 or other input devices, the electronic device can be shifted to the power-on state immediately before the sub microcomputer 30 selects the control program according to the selection instruction of the main microcomputer 20.

In addition, the information sent from the main microcomputer 20 to the sub microcomputer 30 during a certain period in the standby state of the electronic device 10 is not limited to the selection instruction of the specification. For example, when the main microcomputer 20 is temporarily turned on, the main microcomputer 20 can send the instruction to set a remote lock on the sub microcomputer 30 according to the specification of the electronic device 10. The remote lock means not to respond to the instruction from the remote controller device 70. In other words, in case the specification indicated by the specification information is a certain specification, the main microcomputer 20 sends the instruction to set the remote lock together with the selection instruction of the specification to the sub microcomputer 30. If the sub microcomputer 30 received the instruction to set the remote lock, the sub microcomputer 30 wouldn't receive the instruction from the remote controller device 70 before an instruction to cancel the remote lock is received. A user can instruct to cancel the remote lock by operating the operation panel 61.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:
1. An electronic device comprising:
   a main microcomputer that controls some functions of the electronic device, and a sub microcomputer that executes a process according to an operation input from an external device by using a control program, wherein the sub microcomputer has a first memory that stores plural control programs respectively corresponding to each different specification of the electronic device, the main microcomputer has a second memory that stores specification information to specify the electronic device and sends a selection instruction of the specification to the sub microcomputer based on the specification information stored in the second memory, and the sub microcomputer selects a control program corresponding to the specification indicated by the selection instruction from the plural control programs stored in the first memory and then executes a process according to the selected control program.

2. The electronic device according to claim 1, wherein when the electronic device is connected to an external power source, the main microcomputer is turned on after the sub microcomputer is turned on, the main microcomputer sends the selection instruction to the sub microcomputer after communication with the sub microcomputer is established, and then the main microcomputer is turned off.

3. The electronic device according to claim 1, wherein based on the operation input from the external device, when the sub microcomputer receives a predetermined instruction signal in which an operation instruction is assigned without depending on the specification of the electronic device before selecting the control program according to the selection instruction received from the main microcomputer, the sub microcomputer executes the assigned operation.

4. The electronic device according to claim 1, wherein the main microcomputer controls functions including an image processing and a power supply control, the sub microcomputer executes processes according to an operation input from external device including a remote controller device and an operation panel by using the control program, during a standby state where an AC cable of the electronic device is connected to an external power source and an instruction to turn on the electronic device is not input, the sub microcomputer is turned on and the main microcomputer remains turned off, during the standby state, the main microcomputer is temporarily turned on, the main microcomputer sends the selection instruction to the sub microcomputer after communication with the sub microcomputer is established via a bidirectional communication bus, and then the main microcomputer is turned off, the sub microcomputer interprets the operation input from the external device and executes the process according to the interpreted operation by using the selected control program, and based on the operation input from the external device, when the sub microcomputer receives a predetermined instruction signal in which an operation instruction to shift the electronic device to a power-on state is assigned without depending on the specification of the electronic device before selecting the control program according to the selection instruction received from the main microcomputer, the sub microcomputer instructs the main microcomputer to shift the electronic device to the power-on state.

* * * * *